United States Patent
Wan et al.

(10) Patent No.: US 10,705,188 B2
(45) Date of Patent: Jul. 7, 2020

(54) LASER POINT CLOUD POSITIONING METHOD AND SYSTEM

(71) Applicant: BAIDU ONLINE NETWORK TECHNOLOGY (BEIJING) CO., LTD., Beijing (CN)

(72) Inventors: Guowei Wan, Beijing (CN); Hao Li, Beijing (CN); Yao Zhou, Beijing (CN); Shiyu Song, Beijing (CN); Fangfang Dong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 3 days.

(21) Appl. No.: 16/168,179

(22) Filed: Oct. 23, 2018

(65) Prior Publication Data
US 2019/0146062 A1    May 16, 2019

(30) Foreign Application Priority Data

Nov. 15, 2017 (CN) .......................... 2017 1 1128451

(51) Int. Cl.
*G01S 7/48* (2006.01)
*G05D 1/00* (2006.01)
(Continued)

(52) U.S. Cl.
CPC .......... *G01S 7/4808* (2013.01); *G05D 1/0088* (2013.01); *G05D 1/0231* (2013.01);
(Continued)

(58) Field of Classification Search
CPC ..... G01S 7/4808; G01S 17/89; G05D 1/0088; G05D 1/0231; G05D 1/0274;
(Continued)

(56) References Cited

U.S. PATENT DOCUMENTS

| 2016/0093101 | A1* | 3/2016 | Benedek | G06K 9/00201 345/420 |
| 2018/0149753 | A1* | 5/2018 | Shin | G01S 17/89 |

(Continued)

*Primary Examiner* — Yu Chen
(74) *Attorney, Agent, or Firm* — Ladas & Parry, LLP (57) ABSTRACT

The present disclosure provides a laser point cloud positioning method and system. The method comprises: converting laser point cloud reflection value data and height value data matched with a current location of an autonomous vehicle into laser point cloud projection data in a ground plane; assigning a weight for a reflection value matching probability and a height value matching probability of the laser point cloud projection data and a laser point cloud two-dimensional grid map, and determining a matching probability of the laser point cloud projection data and the laser point cloud two-dimensional grid map; determining a location of the autonomous vehicle in the laser point cloud two-dimensional grid map based on a matching probability of the laser point cloud projection data and the laser point cloud two-dimensional grid map. The present disclosure is employed to solve the problem in the prior art that when the laser point cloud matches with the map, an undesirable matching effect is achieved by individually considering the reflection value matching or height value matching, or superimposing the two simply. The present disclosure can improve the laser point cloud positioning precision, and enhance robustness of the positioning system.

20 Claims, 2 Drawing Sheets

(51) Int. Cl.
*G05D 1/02* (2020.01)
*G06T 3/00* (2006.01)
*G01S 17/89* (2020.01)

(52) U.S. Cl.
CPC ......... *G05D 1/0274* (2013.01); *G06T 3/0031* (2013.01); *G01S 17/89* (2013.01); G05D 2201/0213 (2013.01); G06T 2207/10028 (2013.01)

(58) Field of Classification Search
CPC .......... G05D 2201/0213; G06T 3/0031; G06T 2207/10028
See application file for complete search history.

(56) References Cited

U.S. PATENT DOCUMENTS

2018/0315221 A1* 11/2018 Jones .................... G06T 11/005
2018/0315232 A1* 11/2018 Jones .................... G06T 15/005
2019/0156566 A1* 5/2019 Chen .................... G09B 29/106

* cited by examiner

LASER POINT CLOUD POSITIONING METHOD AND SYSTEM

The present application claims the priority of Chinese Patent Application No. 201711128451.3, filed on Nov. 15, 2017, with the title of "Laser point cloud positioning method and system". The disclosure of the above applications is incorporated herein by reference in its entirety.

FIELD OF THE DISCLOSURE

The present disclosure relates to the field of automatic control, and particularly to a laser point cloud positioning method and system.

BACKGROUND OF THE DISCLOSURE

Autonomous vehicle is a modern vehicle which can sense ambient environment, make decision and judgment for scenarios and control itself without needing manual control. In the autonomous vehicle, a positioning module is a kernel fundamental module in an autonomous driving system, and not only an indispensable input of a path planning module but also a scenario understanding and classification algorithm simplifying a sensing module. In a current technical solution, a combination of an inertia navigation system and a laser point cloud positioning system is generally employed. At present, a positioning solution using an inertia navigation system mounted with a high-end IMU, and a laser point cloud positioning system is already applied to Google and Baidu autonomous vehicles.

The inertia navigation system provides an initial posture of the autonomous vehicle, including location information (planar location x, y and height z) and posture angles (roll, pitch and jaw). The laser point cloud positioning algorithm is employed to optimize the location information and the yaw.

When matched search is performed for the planar location x, y in the prior art, it is generally feasible to use metrics such as a reflection value and a height value, or individually use the reflection value, or individually use the height value, or use both of them in a simply-superimposed manner.

A drawback of individually considering a metric manner is that a wrong planar location x, y might be obtained when match distribution is undesirable.

The manner of simply superimposing the two to a certain degree overcomes a case of failure of a metric, but it also has a failure case. For example, as for a re-paved road surface, the distribution of reflection value match is very poor, the distribution of the height value match is better, and a final result of simply superimposing the two is relatively poor.

Therefore, individually considering a certain match or simply superimposing is not a good solution.

SUMMARY OF THE DISCLOSURE

A plurality of aspects of the present disclosure provide a laser point cloud positioning method and system, to improve the positioning precision and enhance robustness.

According to an aspect of the present disclosure, there is provided a laser point cloud positioning method, comprising:
converting laser point cloud reflection value data and height value data matched with a current location of an autonomous vehicle into laser point cloud projection data in a ground plane;
assigning a weight for a reflection value matching probability and a height value matching probability of the laser point cloud projection data and a laser point cloud two-dimensional grid map, and determining a matching probability of the laser point cloud projection data and the laser point cloud two-dimensional grid map;
determining a location of the autonomous vehicle in the laser point cloud two-dimensional grid map based on a matching probability of the laser point cloud projection data and the laser point cloud two-dimensional grid map.

The abovementioned aspect and any possible implementation mode further provide an implementation mode: the laser point cloud reflection value data comprises coordinates of respective laser points and laser reflection intensity values corresponding to respective laser points;
the laser point cloud height value data comprises coordinates of respective laser points and height values corresponding to respective laser points.

The abovementioned aspect and any possible implementation mode further provide an implementation mode: the converting laser point cloud reflection value data and height value data into laser point cloud projection data in a ground plane comprises:
projecting laser point cloud reflection values of respective coordinate positions in a three-dimensional space to a ground plane, to obtain laser point cloud reflection values of respective coordinate positions in the ground plane;
project laser point cloud height values of respective coordinate positions in the three-dimensional space to the ground plane, to obtain laser point cloud height values of respective coordinate positions in the ground plane.

The abovementioned aspect and any possible implementation mode further provide an implementation mode: the laser point cloud two-dimensional grid map is generated in the following manner:
gridding the map to obtain map grids;
collecting laser point cloud reflection value data and laser point cloud height value data corresponding to positioned locations of respective map grids;
storing, in respective map grids, map data corresponding thereto;
the map data comprise an average value of laser reflection intensity values of respective laser points in the positioned locations corresponding to the map grids, a variance of laser reflection intensity values of respective laser points in the positioned locations corresponding to the map grids, an average value of height values of respective laser points in the positioned locations corresponding to the map grids, and the number of respective laser points in the positioned locations corresponding to the map grids.

The abovementioned aspect and any possible implementation mode further provide an implementation mode: the assigning a weight for a reflection value matching probability and a height value matching probability of the laser point cloud projection data and a laser point cloud two-dimensional grid map, and determining a matching probability of the laser point cloud projection data and the laser point cloud two-dimensional grid map comprises:
calculating a reflection value matching probability and a height value matching probability of the laser point cloud projection data and the laser point cloud two-dimensional grid map;
according to a variance of distribution of the reflection value matching probability and a variance of distribution of the height value matching probability, calculate an adaptive weight of the reflection value matching probability and an adaptive weight of the height value matching probability;

calculating a matching probability of the laser point cloud projection data and the laser point cloud two-dimensional grid map, according to the reflection value matching probability, the height value matching probability and the adaptive weights obtained from the calculation.

The abovementioned aspect and any possible implementation mode further provide an implementation mode: the adaptive weight γ of the reflection value matching probability is calculated from the following equation:

$$\gamma = \frac{\sigma_x^2(a)\sigma_y^2(a)}{\sigma_x^2(a)\sigma_y^2(a) + \sigma_x^2(r)\sigma_y^2(r)},$$

where $\sigma_x^2(r)$ is a variance of the distribution of the reflection value matching probability in a direction x, $\sigma_y^2(r)$ is a variance of the distribution of the reflection value matching probability in a direction y, $\sigma_x^2(a)$ is a variance of the distribution of the height value matching probability in a direction x, and $\sigma_y^2(a)$ is a variance of the distribution of the height value matching probability in a direction y;

the adaptive weight of the height value matching probability is 1−γ.

The abovementioned aspect and any possible implementation mode further provide an implementation mode: the determining a location of the autonomous vehicle in the laser point cloud two-dimensional grid map based on the matching probability comprises:

updating the matching probability of the laser point cloud projection data and the laser point cloud two-dimensional grid map based on a previous positioned location, and calculating a posterior probability of the laser point cloud projection data in a predetermined range of the laser point cloud two-dimensional grid map;

determining a location of the autonomous vehicle in the laser point cloud two-dimensional grid map based on distribution of the posterior probability.

According to another aspect of the present disclosure, there is provided a laser point cloud positioning system, comprising:

a converting module configured to convert laser point cloud reflection value data and height value data matched with a current location of an autonomous vehicle into laser point cloud projection data in a ground plane;

a matching probability determining module configured to assign a weight for a reflection value matching probability and a height value matching probability of the laser point cloud projection data and a laser point cloud two-dimensional grid map, and determine a matching probability of the laser point cloud projection data and the laser point cloud two-dimensional grid map;

a location determining module configured to determine a location of the autonomous vehicle in the laser point cloud two-dimensional grid map based on a matching probability of the laser point cloud projection data and the laser point cloud two-dimensional grid map.

The abovementioned aspect and any possible implementation mode further provide an implementation mode: the laser point cloud reflection value data comprises coordinates of respective laser points and laser reflection intensity values corresponding to respective laser points;

the laser point cloud height value data comprises coordinates of respective laser points and height values corresponding to respective laser points.

The abovementioned aspect and any possible implementation mode further provide an implementation mode: the converting module is specifically configured to:

project laser point cloud reflection values of respective coordinate positions in a three-dimensional space to a ground plane, to obtain laser point cloud reflection values of respective coordinate positions in the ground plane;

project laser point cloud height values of respective coordinate positions in the three-dimensional space to the ground plane, to obtain laser point cloud height values of respective coordinate positions in the ground plane.

The abovementioned aspect and any possible implementation mode further provide an implementation mode: the laser point cloud two-dimensional grid map is generated in the following manner:

gridding the map to obtain map grids;

collecting laser point cloud reflection value data and laser point cloud height value data corresponding to positioned locations of respective map grids;

storing, in respective map grids, map data corresponding thereto;

the map data comprise an average value of laser reflection intensity values of respective laser points in the positioned locations corresponding to the map grids, a variance of laser reflection intensity values of respective laser points in the positioned locations corresponding to the map grids, an average value of height values of respective laser points in the positioned locations corresponding to the map grids, and the number of respective laser points in the positioned locations corresponding to the map grids.

The abovementioned aspect and any possible implementation mode further provide an implementation mode: the matching probability determining module is specifically configured to:

calculate a reflection value matching probability and a height value matching probability of the laser point cloud projection data and the laser point cloud two-dimensional grid map;

according to a variance of distribution of the reflection value matching probability and a variance of distribution of the height value matching probability, calculate an adaptive weight of the reflection value matching probability and an adaptive weight of the height value matching probability;

calculate a matching probability of the laser point cloud projection data and the laser point cloud two-dimensional grid map, according to the reflection value matching probability, the height value matching probability and the adaptive weights obtained from the calculation.

The abovementioned aspect and any possible implementation mode further provide an implementation mode: the adaptive weight γ of the reflection value matching probability is calculated from the following equation:

$$\gamma = \frac{\sigma_x^2(a)\sigma_y^2(a)}{\sigma_x^2(a)\sigma_y^2(a) + \sigma_x^2(r)\sigma_y^2(r)},$$

where $\sigma_x^2(r)$ is a variance of the distribution of the reflection value matching probability in a direction X, $\sigma_y^2(r)$ is a variance of the distribution of the reflection value matching probability in a direction y, $\sigma_x^2(a)$ is a variance of the distribution of the height value matching probability in a direction X, and $\sigma_y^2(a)$ is a variance of the distribution of the height value matching probability in a direction y;

the adaptive weight of the height value matching probability is 1−γ.

The abovementioned aspect and any possible implementation mode further provide an implementation mode: the location determining module is specifically configured to:

update the matching probability of the laser point cloud projection data and the laser point cloud two-dimensional grid map based on a previous positioned location, and calculate a posterior probability of the laser point cloud projection data in a predetermined range of the laser point cloud two-dimensional grid map;

determine a location of the autonomous vehicle in the laser point cloud two-dimensional grid map based on distribution of the posterior probability.

A further aspect of the present disclosure provides a computer device, comprising a memory, a processor and a computer program which is stored on the memory and runnable on the processor, wherein the processor, upon executing the program, implements the above-mentioned method.

A further aspect of the present disclosure provides a computer-readable storage medium on which a computer program is stored, wherein the program, when executed by a processor, implements the aforesaid method.

As known from the technical solutions, embodiments of the present disclosure improve the laser point cloud positioning precision, and enhance robustness.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

An exemplary system architecture of an embodiment which may employ the laser point cloud positioning method or laser point cloud positioning system of the present application may comprise an autonomous vehicle, a network and a server.

The network is used to provide a medium of a communication link between the autonomous vehicle and the server and may include various connection types such as wired and wireless communication links.

The autonomous vehicle may interact with the server through the network to receive a transmitted message. The autonomous vehicle may be mounted with a LiDar laser radar, an inertia navigation system and a communication device.

The server may be a server providing various service, for example, a server that performs processing for laser point cloud reflection value data and height value data collected by the autonomous vehicle, and feeds a processing result (e.g., position information of the autonomous vehicle) back to the server of the autonomous vehicle.

It needs to be appreciated that the laser point cloud positioning method according to the embodiment of the present application may be executed by the autonomous vehicle, or by the server, or partial steps are executed by the autonomous vehicle and remaining steps are executed by the server. Correspondingly, the laser point cloud positioning system may be disposed in the server, or in the autonomous vehicle, or partial modules are disposed in the server and remaining modules are disposed in the autonomous vehicle.

Figure 1:
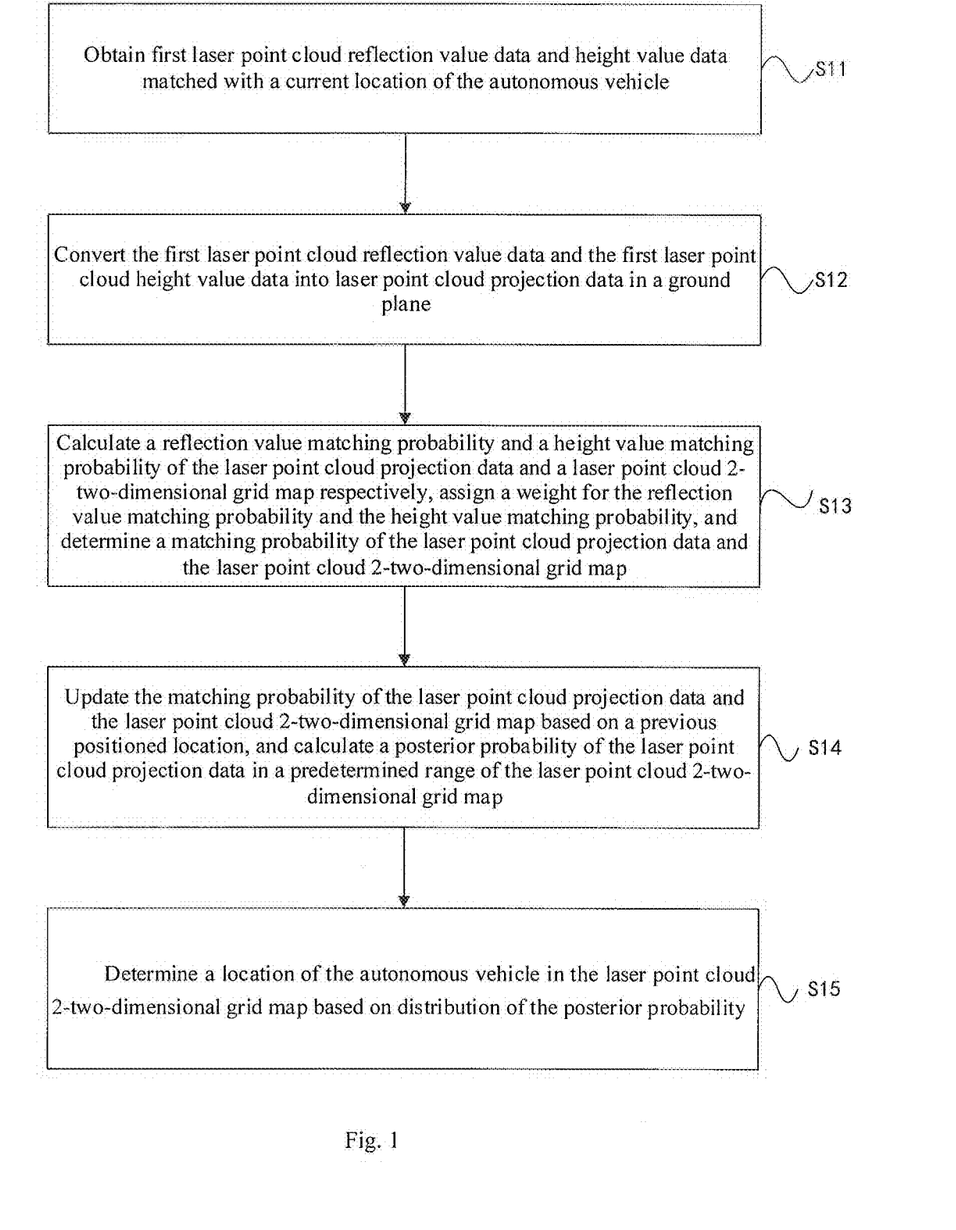
FIG. 1 is a flow chart of a laser point cloud positioning method according to an embodiment of the present disclosure.

FIG. 1 is a flow chart of a laser point cloud positioning method according to an embodiment of the present disclosure. As shown in FIG. 1, the method comprises the following steps:

Step S11: obtaining first laser point cloud reflection value data and height value data matched with a current location of the autonomous vehicle;

Step S12: converting the first laser point cloud reflection value data and the first laser point cloud height value data into laser point cloud projection data in a ground plane;

Step S13: calculate a reflection value matching probability and a height value matching probability of the laser point cloud projection data and a laser point cloud two-dimensional grid map respectively, assigning a weight for the reflection value matching probability and the height value matching probability, and determining a matching probability of the laser point cloud projection data and the laser point cloud two-dimensional grid map;

Step S14: updating the matching probability of the laser point cloud projection data and the laser point cloud two-dimensional grid map based on a previous positioned location, and calculating a posterior probability of the laser point cloud projection data in a predetermined range of the laser point cloud two-dimensional grid map;

Step S15: determining a location of the autonomous vehicle in the laser point cloud two-dimensional grid map based on distribution of the posterior probability.

In a preferred implementation mode of step S11,

The first laser point cloud reflection value data comprises first coordinates of respective laser points and laser reflection intensity values corresponding to respective laser points in the first laser point cloud reflection value data; the first laser point cloud height value data comprises first coordinates of respective laser points and height values corresponding to respective laser points in the first laser point cloud height value data.

In some optional implementation modes, the first coordinates of the laser points may be coordinates of respective laser points in a vehicle coordinate system of the autonomous vehicle.

The laser point cloud reflection value is a reflection intensity after laser point irradiates an object, and its range of value for example may be 0-255.

Assuming that coordinates of the laser point reflected after the laser irradiates the object is (x, y, z), z may be regarded as a height value of the laser point.

It may be a laser point cloud reflection value collecting device of the autonomous vehicle that collects the first laser point cloud reflection value data of the current location of the autonomous vehicle, and it is a laser point cloud height value collecting device on the autonomous vehicle that collects the first laser point cloud height value data of the current location of the autonomous vehicle; then the data are uploaded to a server in a wired or wireless connection manner to achieve obtainment of the first laser point cloud reflection value data and the first laser point cloud height value data.

It needs to be appreciated that the above wireless connection manner may include but not limited to 3G/4G connection, WiFi connection. Bluetooth connection, WiMAX connection, Zigbee connection, UWB (ultrawideband) connection and other wireless connection manners that are currently known or to be developed in the future.

In a preferred implementation mode of step S12,

It is possible to, by projecting the first laser point cloud reflection value data to the ground plane, convert the laser point cloud reflection values of respective coordinate positions in the three-dimensional space obtained in step S21 into laser point cloud reflection values of respective coordinate positions in the ground plane.

It is possible to, by projecting the first laser point cloud height value data to the ground plane, convert the laser point cloud height values of respective coordinate positions in the three-dimensional space obtained in step S21 into laser point cloud height values of respective coordinate positions in the ground plane.

In some optional implementation modes, the converting the first laser point cloud reflection value data and the first laser point cloud height value data into laser point cloud projection data in a ground plane may further comprise:

Step S121: converting the first laser point cloud reflection value data and the first laser point cloud height value data into a third laser point cloud reflection value data and a third laser point cloud height value data.

The third laser point cloud reflection value data for example may include third coordinates of respective laser points and laser reflection intensity values corresponding to respective laser points in the first laser point cloud reflection value data, wherein the third coordinates are coordinates of respective laser points in the first laser point cloud reflection value data under a world coordinate system; the third laser point cloud height value data comprises third coordinates of respective laser points and height values corresponding to respective laser points in the first laser point cloud height value data, wherein the third coordinates are coordinates of respective laser points in the first laser point cloud height value data under the world coordinate system.

Step S122: projecting the third laser point cloud reflection value data and the third laser point cloud height value data to the ground plane, and generating laser point cloud projection data.

Projecting the laser point cloud reflection values of respective coordinate positions under the world coordinate system to the ground plane to obtain laser point cloud reflection values of respective coordinate positions in the ground plane; projecting the laser point cloud height values of respective coordinate positions under the world coordinate system to the ground plane to obtain laser point cloud height values of respective coordinate positions in the ground plane.

The laser point cloud projection data may include projection coordinates of respective laser points, an average value of laser reflection intensity values of respective laser points in respective projection grids, a variance of laser reflection intensity values of respective laser points in respective projection grids, an average value of height values of respective laser points in respective projection grids, a variance of height values of respective laser points in respective projection grids, and the number of respective laser points in respective projection grids.

The respective projection grids may have the same size and shape as a map grid, for example, may be congruent rectangles.

In a preferred implementation mode of step S13,

In some optional implementation modes, the laser point cloud two-dimensional grid map may be generated through the following process:

Specifically, step S21 relates to dividing a globe surface into M×N map regions in the ground plane of the world coordinate system, wherein the map regions for example may have the same size and shape.

In some optional implementation modes, the world coordinate system may employ a UTM coordinate system (Universal Transverse Mercator System).

Step S22 relates to further dividing respective map regions into m×n map grids, wherein respective map grids have the same size and shape.

Since the map regions obtained from division in step S21 might cover a larger region scope, during generation of the laser point cloud two-dimensional grid map, the number of laser points in respective map regions might have a rather large order of magnitude so that a computing workload of positioning processing is larger. In addition, when the map region might cover a larger region scope, a positioning result obtained based on the map has a lower precision. Hence, it is possible to further finely divide the respective map regions so as to reduce the computing workload of the positioning processing and improve the positioning precision of the positioning result.

Step S23 relates to collecting a second laser point cloud reflection value data and a second laser point cloud height value data corresponding to positioned locations of respective map grids, wherein the second laser point cloud reflection value data comprise second coordinates of respective laser points under the world coordinate system and laser reflection intensity values corresponding to respective laser points in the second laser point cloud reflection value data; the second laser point cloud height value data comprises second coordinates of respective laser points under the world coordinate system and height values corresponding to respective laser points in the second laser point cloud height value data.

Step S24 relates to storing, in respective map grids, map data corresponding thereto, wherein the map data comprise an average value of laser reflection intensity values of respective laser points in the positioned locations corresponding to the map grids, a variance of laser reflection intensity values of respective laser points in the positioned locations corresponding to the map grids, an average value of height values of respective laser points in the positioned locations corresponding to the map grids, and the number of respective laser points in the positioned locations corresponding to the map grids.

In the present embodiments, the laser point cloud two-dimensional grid map is a pre-built two-dimensional grid map m including the average value of the reflection values, the variance of the reflection values, the average value of the height values and the variance of the height values.

Step S13 may comprise the following sub-steps:

Step S131: calculating a reflection value matching probability and a height value matching probability of the laser point cloud projection data and the laser point cloud two-dimensional grid map respectively;

wherein, the reflection value matching employs SSD (Sum of Squared Difference) to measure a similarity between laser point cloud projection data z and a map m, with the following calculation equation:

$$SSD_r = \sum_{i,j} \frac{(r_{m(i-x,j-y)} - r_{z(i,j)})^2 (\sigma^2_{m(i-x,j-y)} + \sigma^2_{z(i,j)})}{\sigma^2_{m(i-x,j-y)} \sigma^2_{z(i,j)}} \quad (1)$$

where $r_z$ and $r_m$ respectively represent an average value of reflection intensity values of the laser point cloud projection data and laser point cloud two-dimensional grid map, and $\sigma_z$ and $\sigma_m$ respectively represent a variance of reflection intensity values of the laser point cloud projection data and laser point cloud two-dimensional grid map.

The height value matching also employs SSD to measure a similarity between the laser point cloud projection data z and a map m, with the following calculation equation:

$$SSD_a = \sum_{i,j} (a_{m(i-x,j-y)} - a_{z(i,j)})^2 \quad (2)$$

where $a_z$ and $a_m$ respectively represent an average value of height values of the laser point cloud projection data and laser point cloud two-dimensional grid map.

The reflection value matching probability $P(z_r|x,y,m)$ and the height value matching probability $P(z_a|x,y,m)$ may be calculated according to the following equations:

$$P(z_r \mid x, y, m) = \eta \cdot \alpha^{-\frac{SSD_r}{2 \cdot N_z}} \quad (3)$$

$$P(z_a \mid x, y, m) = \eta \cdot \alpha^{-\frac{\lambda \cdot SSD_a}{2 \cdot N_z}}$$

where $\eta$ is a normalization constant; when $\alpha=e$, the above is a function of Gaussian distribution, $\alpha$ is used to adjust smoothness of distribution, and $N_z$ is the number of respective laser points in the positioned location corresponding to the map grid.

Step S132: according to a variance of distribution of the reflection value matching probability and a variance of distribution of the height value matching probability, calculating an adaptive weight $\gamma$ of the reflection value matching probability and an adaptive weight $1-\gamma$ of the height value matching probability; wherein the adaptive weight is calculated from distributions $[P(z_r|x,y,m)]_{xy}$ and $[P(z_a|x,y,m)]_{xy}$ of the reflection value matching probability $P(z_r|x,y,m)$ and the height value matching probability $P(z_a|x,y,m)$, and variances of the two distributions in two directions x and y are calculated first respectively, with the following equations:

$$\sigma^2_x = \frac{\sum_{xy} P(x, y)^\beta (x - \bar{x})^2}{\sum_{xy} P(x, y)^\beta} \quad (4)$$

$$\sigma^2_y = \frac{\sum_{xy} P(x, y)^\beta (y - \bar{y})^2}{\sum_{xy} P(x, y)^\beta}$$

where $\beta$ is a preset constant parameter, and $z_r$ and $z_a$ respectively represent reflective value and height value information in the laser point cloud projection data;

the adaptive weight $\gamma$ is calculated from the following equation:

$$\gamma = \frac{\sigma^2_x(a)\sigma^2_y(a)}{\sigma^2_x(a)\sigma^2_y(a) + \sigma^2_x(r)\sigma^2_y(r)}, \quad (5)$$

where $\sigma_x^2(r)$ is a variance of the distribution of the reflection value matching probability in a direction X, $\sigma_y^2(r)$ is a variance of the distribution of the reflection value matching probability in a direction y, $\sigma_x^2(a)$ is a variance of the distribution of the height value matching probability in a direction x, and $\sigma_y^2(a)$ is a variance of the distribution of the height value matching probability in a direction y.

Step S133: calculating a matching probability of the laser point cloud projection data and the laser point cloud two-dimensional grid map, according to the reflection value matching probability, the height value matching probability and the corresponding weights;

wherein the matching probability of the laser point cloud projection data and the laser point cloud two-dimensional grid map $$P(z|x,y,m) = \eta \cdot P(z_r|x,y,m)^\gamma \cdot P(z_a|x,y,m)^{1-\gamma} \quad (6).$$

In a preferred implementation mode of step S14, using a two-dimensional histogram filter to update the matching probability based on a previous positioned location, and calculating a posterior probability of the laser point cloud projection data in a predetermined range of the laser point cloud two-dimensional grid map.

The posterior probability $$P(x,y|z,m) = \eta \cdot P(z|x,y,m) \cdot (\bar{P}(x,y))^{1/K} \quad (7)$$

where z is an online local map generated by the laser point cloud projection data, m is the laser point cloud two-dimensional grid map, K is a KL divergence (Kullback-Leibler_divergence) of the two probability distributions $\Sigma_{xy} P(z|x,y,m)$ and $\Sigma_{xy} \bar{P}(x,y)$ and used to measure a distance between the two probability distributions.

$\bar{P}(x,y)$ is a prediction probability of a location of the autonomous vehicle appearing in the world coordinates (x, y) based on the previous positioned location. In the present embodiment, control variables of a historical distribution and movement model in the two-dimensional histogram filter are used to predict a prediction probability of each state (x, y) in the histogram filter. A center of the histogram filter may be taken from an inertia navigation system, or from a prediction output of a multi-sensor fusion positioning system. The prediction probability of each state in the histogram filter is obtained by using Gaussian noise to superimpose histogram filter historical distributions.

An equation for calculating the prediction probability of each state (x, y) in the histogram filter is as follows:

$$\bar{P}(x, y) = \eta \cdot \sum_{i,j} P(i, j) \cdot \exp\left(-\frac{(i-x)^2 + (j-y)^2}{2\sigma^2}\right); \quad (8)$$

where P(i,j) is probability predicted and output by an SINS inertia navigation system, for example, an inertial navigation system or the multi-sense fusion positioning system, and a is used to describe movement between two frames.

In a preferred implementation mode of step S25, selecting a small area in the histogram filter to obtain its expectation. The selected small area surrounds a maximum value or the second largest value of the posterior probability P(x,y|z,m). If the second largest value reaches a certain proportion of the maximum value and it is closer to the center of the filter, a position with the second largest value is selected as a center of the small area; otherwise a position with the maximum value is selected as the center of the small area.

Assuming the small area is Z, an optimal planar position $(\hat{x},\hat{y})$ may be calculated from the following equation:

$$\hat{x} = \frac{\sum_{(x,y)\in Z} P(x, y)^\beta \cdot x}{\sum_{(x,y)\in Z} P(x, y)^\beta}$$

$$\hat{y} = \frac{\sum_{(x,y)\in Z} P(x, y)^\beta \cdot y}{\sum_{(x,y)\in Z} P(x, y)^\beta}.$$

(9)

Figure 2:
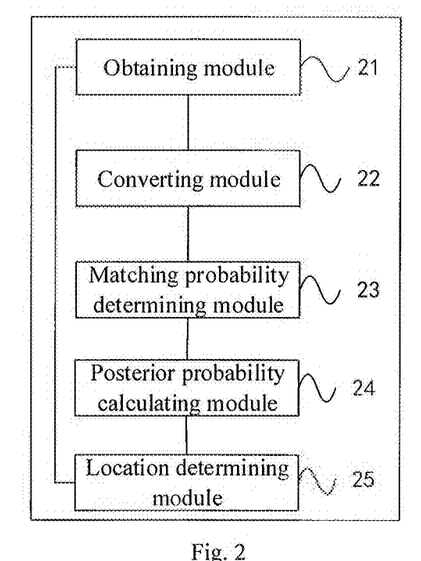
FIG. 2 is a structural schematic diagram of a laser point cloud positioning system according to an embodiment of the present disclosure.

FIG. 2 is a structural schematic diagram of a laser point cloud positioning system according to an embodiment of the present disclosure. As shown in FIG. 2, the system comprises:

an obtaining module 21 configured to obtain first laser point cloud reflection value data and height value data matched with a current location of the autonomous vehicle;

a converting module 22 configured to convert the first laser point cloud reflection value data and the first laser point cloud height value data into laser point cloud projection data in a ground plane;

a matching probability determining module 23 configured to calculate a reflection value matching probability and a height value matching probability of the laser point cloud projection data and a laser point cloud two-dimensional grid map respectively, assign a weight for the reflection value matching probability and the height value matching probability, and determine a matching probability of the laser point cloud projection data and the laser point cloud two-dimensional grid map;

a posterior probability calculating module 24 configured to update the matching probability of the laser point cloud projection data and the laser point cloud two-dimensional grid map based on a previous positioned location, and calculate a posterior probability of the laser point cloud projection data in predetermined range of the laser point cloud two-dimensional grid map;

a location determining module 25 configured to determine a location of the autonomous vehicle in the laser point cloud two-dimensional grid map based on distribution of the posterior probability.

In a preferred implementation mode of the obtaining module 21, the first laser point cloud reflection value data comprises first coordinates of respective laser points and laser reflection intensity values corresponding to respective laser points in the first laser point cloud reflection value data; the first laser point cloud height value data comprises first coordinates of respective laser points and height values corresponding to respective laser points in the first laser point cloud height value data.

In some optional implementation modes, the first coordinates of the laser points may be coordinates of respective laser points in a vehicle coordinate system of the autonomous vehicle.

The laser point cloud reflection value is a reflection intensity after laser point irradiates an object, and its range of value for example may be 0-255.

Assuming that coordinates of the laser point reflected after the laser irradiates the object is (x, y, z), z may be regarded as a height value of the laser point.

It may be a laser point cloud reflection value collecting device of the autonomous vehicle that collects the first laser point cloud reflection value data of the current location of the autonomous vehicle, and it is a laser point cloud height value collecting device on the autonomous vehicle that collects the first laser point cloud height value data of the current location of the autonomous vehicle; then the data are uploaded to a server in a wired or wireless connection manner to achieve obtainment of the first laser point cloud reflection value data and the first laser point cloud height value data.

It needs to be appreciated that the above wireless connection manner may include but not limited to 3G/4G connection, WiFi connection, Bluetooth connection, WiMAX connection, Zigbee connection, UWB (ultrawideband) connection and other wireless connection manners that are currently known or to be developed in the future.

In a preferred implementation mode of the converting module 22,

It is possible to, by projecting the first laser point cloud reflection value data to the ground plane, convert the laser point cloud reflection values of respective coordinate positions in a three-dimensional space obtained by the obtaining module 21 into laser point cloud reflection values of respective coordinate positions in the ground plane.

It is possible to, by projecting the first laser point cloud height value data to the ground plane, convert the laser point cloud height values of respective coordinate positions in the three-dimensional space obtained by the obtaining module 21 into laser point cloud height values of respective coordinate positions in the ground plane.

In some optional implementation modes, the converting module 22 converting the first laser point cloud reflection value data and the first laser point cloud height value data into laser point cloud projection data in a ground plane may further comprise:

converting the first laser point cloud reflection value data and the first laser point cloud height value data into a third laser point cloud reflection value data and a third laser point cloud height value data.

The third laser point cloud reflection value data for example may include third coordinates of respective laser points and laser reflection intensity values corresponding to respective laser points in the first laser point cloud reflection value data, wherein the third coordinates are coordinates of respective laser points in the first laser point cloud reflection value data under a world coordinate system; the third laser point cloud height value data comprises third coordinates of respective laser points and height values corresponding to respective laser points in the first laser point cloud height value data, wherein the third coordinates are coordinates of respective laser points in the first laser point cloud height value data under the world coordinate system.

projecting the third laser point cloud reflection value data and the third laser point cloud height value data to the ground plane, and generating laser point cloud projection data.

Projecting the laser point cloud reflection values of respective coordinate positions under the world coordinate system to the ground plane to obtain laser point cloud reflection values of respective coordinate positions in the ground plane; projecting the laser point cloud height values of respective coordinate positions under the world coordinate system to the ground plane to obtain laser point cloud height values of respective coordinate positions in the ground plane.

The laser point cloud projection data may include projection coordinates of respective laser points, an average value of laser reflection intensity values of respective laser points in respective projection grids, a variance of laser reflection intensity values of respective laser points in respective projection grids, an average value of height values of respective laser points in respective projection grids, a variance of height values of respective laser points in respective projection grids, and the number of respective laser points in respective projection grids.

The respective projection grids may have the same size and shape as a map grid, for example, may be congruent rectangles.

In a preferred implementation mode of the matching probability determining module 23, In some optional implementation modes, the laser point cloud two-dimensional grid map may be generated through the following process:

dividing a globe surface into M×N map regions in the ground plane of the world coordinate system, wherein the map regions for example may have the same size and shape.

In some optional implementation modes, the world coordinate system may employ a UTM coordinate system (Universal Transverse Mercator System).

Further dividing respective map regions into m×n map grids, wherein respective map grids have the same size and shape.

Since the map regions obtained from division might cover a larger region scope, during generation of the laser point cloud two-dimensional grid map, the number of laser points in respective map regions might have a rather large order of magnitude so that a computing workload of positioning processing is larger. In addition, when the map region might cover a larger region scope, a positioning result obtained based on the map has a lower precision. Hence, it is possible to further finely divide the respective map regions so as to reduce the computing workload of the positioning processing and improve the positioning precision of the positioning result.

Collecting second laser point cloud reflection value data and second laser point cloud height value data corresponding to positioned locations of respective map grids, wherein the second laser point cloud reflection value data comprise second coordinates of respective laser points under the world coordinate system and laser reflection intensity values corresponding to respective laser points in the second laser point cloud reflection value data; the second laser point cloud height value data comprises second coordinates of respective laser points under the world coordinate system and height values corresponding to respective laser points in the second laser point cloud height value data.

Storing, in respective map grids, map data corresponding thereto, wherein the map data comprise an average value of laser reflection intensity values of respective laser points in the positioned locations corresponding to the map grids, a variance of laser reflection intensity values of respective laser points in the positioned locations corresponding to the map grids, an average value of height values of respective laser points in the positioned locations corresponding to the map grids, and the number of respective laser points in the positioned locations corresponding to the map grids.

In the present embodiments, the laser point cloud two-dimensional grid map is a pre-built two-dimensional grid map m including the average value of the reflection values, the variance of the reflection values, the average value of the height values and the variance of the height values.

The matching probability determining module 23 is specifically configured to:

calculate a reflection value matching probability and a height value matching probability of the laser point cloud projection data and the laser point cloud two-dimensional grid map respectively;

wherein, the reflection value matching employs SSD (Sum of Squared Difference) to measure a similarity between laser point cloud projection data z and a map m, with the following calculation equation:

$$SSD_r = \sum_{i,j} \frac{(r_{m(i-x,j-y)} - r_{z(i,j)})^2 (\sigma^2_{m(i-x,j-y)} + \sigma^2_{z(i,j)})}{\sigma^2_{m(i-x,j-y)} \sigma^2_{z(i,j)}} \quad (1)$$

where $r_z$ and $r_m$ respectively represent an average value of reflection intensity values of the laser point cloud projection data and laser point cloud two-dimensional grid map, and $\sigma_z$ and $\sigma_m$ respectively represent a variance of reflection intensity values of the laser point cloud projection data and laser point cloud two-dimensional grid map.

The height value matching also employs SSD to measure a similarity between the laser point cloud projection data z and a map m, with the following calculation equation:

$$SSD_a = \sum_{i,j} (a_{m(i-x,j-y)} - a_{z(i,j)})^2 \quad (2)$$

where $a_z$ and $a_m$ respectively represent an average value of height values of the laser point cloud projection data and laser point cloud two-dimensional grid map.

The reflection value matching probability $P(z_r|x,y,m)$ and the height value matching probability $P(z_a|x,y,m)$ may be calculated according to the following equations:

$$P(z_r \mid x, y, m) = \eta \cdot \alpha^{-\frac{SSD_r}{2 \cdot N_z}} \quad (3)$$

$$P(z_a \mid x, y, m) = \eta \cdot \alpha^{-\frac{\lambda \cdot SSD_a}{2 \cdot N_z}}$$

where $\eta$ is a normalization constant; when $\alpha=e$, the above is a function of Gaussian distribution, $\alpha$ is used to adjust smoothness of distribution, and $N_z$ is the number of respective laser points in the positioned location corresponding to the map grid.

According to a variance of distribution of the reflection value matching probability and a variance of distribution of the height value matching probability, calculating an adaptive weight $\gamma$ of the reflection value matching probability and an adaptive weight $1-\gamma$ of the height value matching probability;

wherein the adaptive weight is calculated from distributions $[P(z_r|x,y,m)]_{xy}$ and $[P(z_a|x,y,m)]_{xy}$ of the reflection value matching probability $P(z_r|x,y,m)$ and the height value matching probability $P(z_a|x,y,m)$, and variances of the two distributions in two directions x and y are calculated first respectively, with the following equations:

$$\sigma_x^2 = \frac{\sum_{xy} P(x, y)^\beta (x - \bar{x})^2}{\sum_{xy} P(x, y)^\beta} \quad (4)$$

$$\sigma_y^2 = \frac{\sum_{xy} P(x, y)^\beta (y - \bar{y})^2}{\sum_{xy} P(x, y)^\beta}$$

where β is a preset constant parameter, and $z_r$ and $z_a$ respectively represent reflective value and height value information in the laser point cloud projection data;

the adaptive weight γ is calculated from the following equation:

$$\gamma = \frac{\sigma_x^2(a)\sigma_y^2(a)}{\sigma_x^2(a)\sigma_y^2(a) + \sigma_x^2(r)\sigma_y^2(r)}, \quad (5)$$

where $\sigma_x^2(r)$ is a variance of the distribution of the reflection value matching probability in a direction X, $\sigma_y^2(r)$ is a variance of the distribution of the reflection value matching probability in a direction y, $\sigma_x^2(a)$ is a variance of the distribution of the height value matching probability in a direction x, and $\sigma_y^2(a)$ is a variance of the distribution of the height value matching probability in a direction y.

Calculating a matching probability of the laser point cloud projection data and the laser point cloud two-dimensional grid map, according to the reflection value matching probability, the height value matching probability and the corresponding weights;

wherein the matching probability of the laser point cloud projection data and the laser point cloud two-dimensional grid map $$P(z|x,y,m) = \eta \cdot P(z_r|x,y,m)^\gamma \cdot P(z_a|x,y,m)^{1-\gamma} \quad (6).$$

In a preferred implementation mode of the posterior probability calculating module 24.

the posterior probability calculating module 24 uses a two-dimensional histogram filter to update the matching probability based on a previous positioned location, and calculates a posterior probability of the laser point cloud projection data in a predetermined range of the laser point cloud two-dimensional grid map.

The posterior probability $$P(x,y|z,m) = \eta \cdot P(z|x,y,m) \cdot (\overline{P}(x,y))^{1/K} \quad (7)$$

where z is an online local map generated by the laser point cloud projection data, m is the laser point cloud two-dimensional grid map, K is a KL divergence (Kullback-Leibler_divergence) of the two probability distributions $\Sigma_{xy} P(z|x,y,m)$ and $\Sigma_{xy} \overline{P}(x,y)$ and used to measure a distance between the two probability distributions.

$\overline{P}(x,y)$ is a prediction probability of a location of the autonomous vehicle appearing in the world coordinates (x, y) based on the previous positioned location. In the present embodiment, control variables of a historical distribution and movement model in the two-dimensional histogram filter are used to predict a prediction probability of each state (x, y) in the histogram filter. A center of the histogram filter may be taken from an inertia navigation system, or from a prediction output of a multi-sensor fusion positioning system. The prediction probability of each state in the histogram filter is obtained by using Gaussian noise to superimpose histogram filter historical distributions.

An equation for calculating the prediction probability of each state (x, y) in the histogram filter is as follows:

$$\overline{P}(x, y) = \eta \cdot \sum_{i,j} P(i, j) \cdot \exp\left(-\frac{(i-x)^2 + (j-y)^2}{2\sigma^2}\right); \quad (8)$$

where P(i,j) is probability predicted and output by an SINS inertia navigation system, for example, an inertial navigation system or the multi-sense fusion positioning system, and a is used to describe movement between two frames.

In a preferred implementation mode of the location determining module 25, the location determining module 25 selects a small area in the histogram filter to obtain its expectation. The selected small area surrounds a maximum value or the second largest value of the posterior probability P(x,y|z,m). If the second largest value reaches a certain proportion of the maximum value and it is closer to the center of the filter, a position with the second largest value is selected as a center of the small area: otherwise a position with the maximum value is selected as the center of the small area.

Assuming the small area is Z, an optimal planar position $(\hat{x},\hat{y})$ may be calculated from the following equation:

$$\hat{x} = \frac{\sum_{(x,y)\in Z} P(x, y)^\beta \cdot x}{\sum_{(x,y)\in Z} P(x, y)^\beta} \quad (9)$$

$$\hat{y} = \frac{\sum_{(x,y)\in Z} P(x, y)^\beta \cdot y}{\sum_{(x,y)\in Z} P(x, y)^\beta}.$$

The technical solution of the above embodiment can be employed to adaptively allocate weights according to respective matching situations of the reflection values and height values, avoid inconsistency of the size upon superimposition of the two, improve the positioning precision, and enhance robustness of the positioning module.

It needs to be appreciated that regarding the aforesaid method embodiments, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

The above is introduction of the method embodiment. The solution of the present disclosure will be further described through an apparatus embodiment.

In the above embodiments, different emphasis is placed on respective embodiments, and reference may be made to related depictions in other embodiments for portions not detailed in a certain embodiment.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Figure 3:
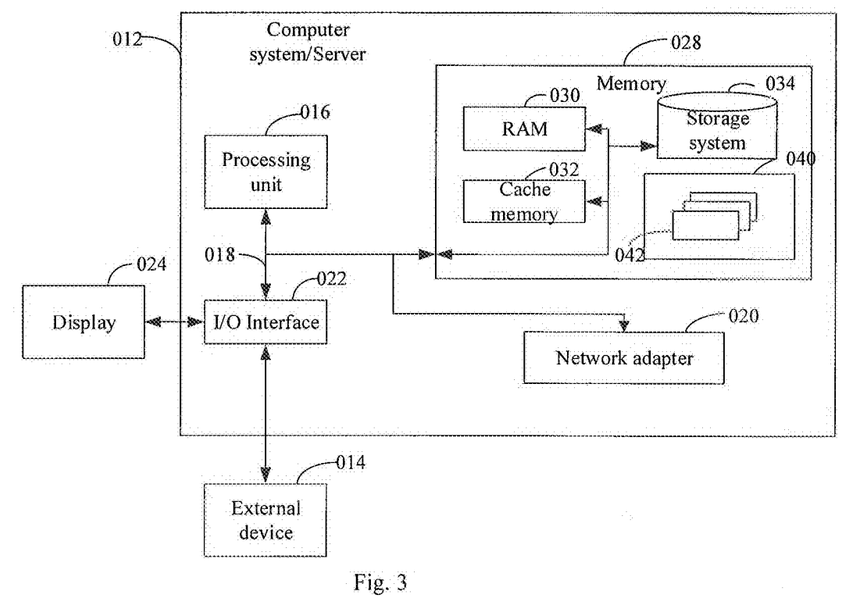
FIG. 3 illustrates a block diagram of an example computer system/server 012 adapted to implement an implementation mode of the present disclosure.

FIG. 3 illustrates a block diagram of an example computer system/server 012 adapted to implement an implementation mode of the present disclosure. The computer system/server 012 shown in FIG. 3 is only an example and should not bring about any limitation to the function and scope of use of the embodiments of the present disclosure.

As shown in FIG. 3, the computer system/server 012 is shown in the form of a general-purpose computing device. The components of computer system/server 012 may include, but are not limited to, one or more processors (processing units) 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes functions and/or methods in embodiments described in the present disclosure by running programs stored in the system memory 028.

The above-mentioned computer program may be set in a computer storage medium, i.e., the computer storage medium is encoded with a computer program. When the program, executed by one or more computers, enables said one or more computers to execute steps of methods and/or operations of apparatuses as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A laser point cloud positioning method, wherein the method comprises:
converting laser point cloud reflection value data and height value data matched with a current location of an autonomous vehicle into laser point cloud projection data in a ground plane;
assigning a weight for a reflection value matching probability and a height value matching probability of the laser point cloud projection data and a laser point cloud two-dimensional grid map, and determining a matching probability of the laser point cloud projection data and the laser point cloud two-dimensional grid map;
determining a location of the autonomous vehicle in the laser point cloud two-dimensional grid map based on a matching probability of the laser point cloud projection data and the laser point cloud two-dimensional grid map.

2. The method according to claim 1, wherein
the laser point cloud reflection value data comprises coordinates of respective laser points and laser reflection intensity values corresponding to respective laser points;
the laser point cloud height value data comprises coordinates of respective laser points and height values corresponding to respective laser points.

3. The method according to claim 1, wherein
the converting laser point cloud reflection value data and height value data into laser point cloud projection data in a ground plane comprises:
projecting laser point cloud reflection values of respective coordinate positions in a three-dimensional space to a ground plane, to obtain laser point cloud reflection values of respective coordinate positions in the ground plane;
project laser point cloud height values of respective coordinate positions in the three-dimensional space to the ground plane, to obtain laser point cloud height values of respective coordinate positions in the ground plane.

4. The method according to claim 1, wherein the laser point cloud two-dimensional grid map is generated in the following manner:
gridding the map to obtain map grids;
collecting laser point cloud reflection value data and laser point cloud height value data corresponding to positioned locations of respective map grids;
storing, in respective map grids, map data corresponding thereto;
the map data comprise an average value of laser reflection intensity values of respective laser points in the positioned locations corresponding to the map grids, a variance of laser reflection intensity values of respective laser points in the positioned locations corresponding to the map grids, an average value of height values of respective laser points in the positioned locations corresponding to the map grids, and the number of respective laser points in the positioned locations corresponding to the map grids.

5. The method according to claim 1, wherein
the assigning a weight for a reflection value matching probability and a height value matching probability of the laser point cloud projection data and a laser point cloud two-dimensional grid map, and determining a matching probability of the laser point cloud projection data and the laser point cloud two-dimensional grid map comprises:
calculating a reflection value matching probability and a height value matching probability of the laser point cloud projection data and the laser point cloud two-dimensional grid map;
according to a variance of distribution of the reflection value matching probability and a variance of distribution of the height value matching probability, calculate an adaptive weight of the reflection value matching probability and an adaptive weight of the height value matching probability;

calculating a matching probability of the laser point cloud projection data and the laser point cloud two-dimensional grid map, according to the reflection value matching probability, the height value matching probability and the adaptive weights obtained from the calculation.

6. The method according to claim 5, wherein the adaptive weight γ of the reflection value matching probability is calculated from the following equation:

$$\gamma = \frac{\sigma_x^2(a)\sigma_y^2(a)}{\sigma_x^2(a)\sigma_y^2(a) + \sigma_x^2(r)\sigma_y^2(r)},$$

where $\sigma_x^2(r)$ is a variance of the distribution of the reflection value matching probability in a direction x, $\sigma_y^2(a)$ is a variance of the distribution of the reflection value matching probability in a direction y, $\sigma_x^2(a)$ is a variance of the distribution of the height value matching probability in a direction x, and $\sigma_y^2(a)$ is a variance of the distribution of the height value matching probability in a direction y;

the adaptive weight of the height value matching probability is 1−γ.

7. The method according to claim 1, wherein the determining a location of the autonomous vehicle in the laser point cloud two-dimensional grid map based on the matching probability comprises:
updating the matching probability of the laser point cloud projection data and the laser point cloud two-dimensional grid map based on a previous positioned location, and calculating a posterior probability of the laser point cloud projection data in a predetermined range of the laser point cloud two-dimensional grid map;
determining a location of the autonomous vehicle in the laser point cloud two-dimensional grid map based on distribution of the posterior probability.

8. A computer device, comprising a memory, a processor and a computer program which is stored on the memory and runnable on the processor, wherein the processor, upon executing the program, implements a laser point cloud positioning method, wherein the method comprises:
converting laser point cloud reflection value data and height value data matched with a current location of an autonomous vehicle into laser point cloud projection data in a ground plane;
assigning a weight for a reflection value matching probability and a height value matching probability of the laser point cloud projection data and a laser point cloud two-dimensional grid map, and determining a matching probability of the laser point cloud projection data and the laser point cloud two-dimensional grid map;
determining a location of the autonomous vehicle in the laser point cloud two-dimensional grid map based on a matching probability of the laser point cloud projection data and the laser point cloud two-dimensional grid map.

9. The computer device according to claim 8, wherein
the laser point cloud reflection value data comprises coordinates of respective laser points and laser reflection intensity values corresponding to respective laser points;
the laser point cloud height value data comprises coordinates of respective laser points and height values corresponding to respective laser points.

10. The computer device according to claim 8, wherein
the converting laser point cloud reflection value data and height value data into laser point cloud projection data in a ground plane comprises:
projecting laser point cloud reflection values of respective coordinate positions in a three-dimensional space to a ground plane, to obtain laser point cloud reflection values of respective coordinate positions in the ground plane;
project laser point cloud height values of respective coordinate positions in the three-dimensional space to the ground plane, to obtain laser point cloud height values of respective coordinate positions in the ground plane.

11. The computer device according to claim 8, wherein the laser point cloud two-dimensional grid map is generated in the following manner:
gridding the map to obtain map grids;
collecting laser point cloud reflection value data and laser point cloud height value data corresponding to positioned locations of respective map grids;
storing, in respective map grids, map data corresponding thereto;
the map data comprise an average value of laser reflection intensity values of respective laser points in the positioned locations corresponding to the map grids, a variance of laser reflection intensity values of respective laser points in the positioned locations corresponding to the map grids, an average value of height values of respective laser points in the positioned locations corresponding to the map grids, and the number of respective laser points in the positioned locations corresponding to the map grids.

12. The computer device according to claim 8, wherein
the assigning a weight for a reflection value matching probability and a height value matching probability of the laser point cloud projection data and a laser point cloud two-dimensional grid map, and determining a matching probability of the laser point cloud projection data and the laser point cloud two-dimensional grid map comprises:
calculating a reflection value matching probability and a height value matching probability of the laser point cloud projection data and the laser point cloud two-dimensional grid map;
according to a variance of distribution of the reflection value matching probability and a variance of distribution of the height value matching probability, calculate an adaptive weight of the reflection value matching probability and an adaptive weight of the height value matching probability;
calculating a matching probability of the laser point cloud projection data and the laser point cloud two-dimensional grid map, according to the reflection value matching probability, the height value matching probability and the adaptive weights obtained from the calculation.

13. The computer device according to claim 12, wherein the adaptive weight γ of the reflection value matching probability is calculated from the following equation:

$$\gamma = \frac{\sigma_x^2(a)\sigma_y^2(a)}{\sigma_x^2(a)\sigma_y^2(a) + \sigma_x^2(r)\sigma_y^2(r)},$$

where $\sigma_x^2(r)$ is a variance of the distribution of the reflection value matching probability in a direction x, $\sigma_y^2(r)$ is a variance of the distribution of the reflection value matching probability in a direction y, $\sigma_x^2(a)$ is a variance of the distribution of the height value matching probability in a direction x, and $\sigma_y^2(a)$ is a variance of the distribution of the height value matching probability in a direction y;

the adaptive weight of the height value matching probability is 1−γ.

14. The computer device according to claim 8, wherein the determining a location of the autonomous vehicle in the laser point cloud two-dimensional grid map based on the matching probability comprises:
   updating the matching probability of the laser point cloud projection data and the laser point cloud two-dimensional grid map based on a previous positioned location, and calculating a posterior probability of the laser point cloud projection data in a predetermined range of the laser point cloud two-dimensional grid map;
   determining a location of the autonomous vehicle in the laser point cloud two-dimensional grid map based on distribution of the posterior probability.

15. A non-transitory computer-readable storage medium on which a computer program is stored, wherein the program, when executed by a processor, implements a laser point cloud positioning method, wherein the method comprises:
   converting laser point cloud reflection value data and height value data matched with a current location of an autonomous vehicle into laser point cloud projection data in a ground plane;
   assigning a weight for a reflection value matching probability and a height value matching probability of the laser point cloud projection data and a laser point cloud two-dimensional grid map, and determining a matching probability of the laser point cloud projection data and the laser point cloud two-dimensional grid map;
   determining a location of the autonomous vehicle in the laser point cloud two-dimensional grid map based on a matching probability of the laser point cloud projection data and the laser point cloud two-dimensional grid map.

16. The non-transitory computer-readable storage medium according to claim 15, wherein
   the laser point cloud reflection value data comprises coordinates of respective laser points and laser reflection intensity values corresponding to respective laser points;
   the laser point cloud height value data comprises coordinates of respective laser points and height values corresponding to respective laser points.

17. The non-transitory computer-readable storage medium according to claim 15, wherein
   the converting laser point cloud reflection value data and height value data into laser point cloud projection data in a ground plane comprises:
   projecting laser point cloud reflection values of respective coordinate positions in a three-dimensional space to a ground plane, to obtain laser point cloud reflection values of respective coordinate positions in the ground plane;
   project laser point cloud height values of respective coordinate positions in the three-dimensional space to the ground plane, to obtain laser point cloud height values of respective coordinate positions in the ground plane.

18. The non-transitory computer-readable storage medium according to claim 15, wherein the laser point cloud two-dimensional grid map is generated in the following manner:
   gridding the map to obtain map grids;
   collecting laser point cloud reflection value data and laser point cloud height value data corresponding to positioned locations of respective map grids;
   storing, in respective map grids, map data corresponding thereto;
   the map data comprise an average value of laser reflection intensity values of respective laser points in the positioned locations corresponding to the map grids, a variance of laser reflection intensity values of respective laser points in the positioned locations corresponding to the map grids, an average value of height values of respective laser points in the positioned locations corresponding to the map grids, and the number of respective laser points in the positioned locations corresponding to the map grids.

19. The non-transitory computer-readable storage medium according to claim 15, wherein
   the assigning a weight for a reflection value matching probability and a height value matching probability of the laser point cloud projection data and a laser point cloud two-dimensional grid map, and determining a matching probability of the laser point cloud projection data and the laser point cloud two-dimensional grid map comprises:
   calculating a reflection value matching probability and a height value matching probability of the laser point cloud projection data and the laser point cloud two-dimensional grid map;
   according to a variance of distribution of the reflection value matching probability and a variance of distribution of the height value matching probability, calculate an adaptive weight of the reflection value matching probability and an adaptive weight of the height value matching probability;
   calculating a matching probability of the laser point cloud projection data and the laser point cloud two-dimensional grid map, according to the reflection value matching probability, the height value matching probability and the adaptive weights obtained from the calculation.

20. The non-transitory computer-readable storage medium according to claim 19, wherein the adaptive weight γ of the reflection value matching probability is calculated from the following equation:

$$\gamma = \frac{\sigma_x^2(a)\sigma_y^2(a)}{\sigma_x^2(a)\sigma_y^2(a) + \sigma_x^2(r)\sigma_y^2(r)},$$

where $\sigma_x^2(r)$ is a variance of the distribution of the reflection value matching probability in a direction x, $\sigma_y^2(r)$ is a variance of the distribution of the reflection value matching probability in a direction y, $\sigma_x^2(a)$ is a variance of the distribution of the height value matching probability in a direction x, and $\sigma_y^2(a)$ is a variance of the distribution of the height value matching probability in a direction y;

the adaptive weight of the height value matching probability is 1−γ.

* * * * *